(12) United States Patent
Randolph et al.

(10) Patent No.: US 9,409,476 B2
(45) Date of Patent: Aug. 9, 2016

(54) FUEL FILL APPARATUS FOR USE WITH FUEL DELIVERY SYSTEMS

(75) Inventors: Eric Randolph, Fond du Lac, WI (US); Tony Slabaugh, Belmont, MI (US); Patrick Roach, Lowell, MI (US)

(73) Assignee: BRUNSWICK CORPORATION, Lake Forest, IL (US)

( * ) Notice: Subject to any disclaimer, the term of this patent is extended or adjusted under 35 U.S.C. 154(b) by 930 days.

(21) Appl. No.: 13/242,942

(22) Filed: Sep. 23, 2011

(65) Prior Publication Data

US 2012/0074137 A1 Mar. 29, 2012

Related U.S. Application Data

(60) Provisional application No. 61/386,471, filed on Sep. 25, 2010.

(51) Int. Cl.
*B60K 15/04* (2006.01)
*B60K 15/035* (2006.01)

(52) U.S. Cl.
CPC .............. *B60K 15/04* (2013.01); *B60K 15/035* (2013.01); *B60K 15/0406* (2013.01); *B60K 15/03519* (2013.01); *B60K 2015/03538* (2013.01); *B60K 2015/0445* (2013.01)

(58) Field of Classification Search
CPC .. B60K 15/04; B60K 15/0406; B60K 15/035; B60K 2015/03523
USPC .............. 141/348–350, 367, 383, 290, 59; 220/86.2, 304, 366.1, 367.1, 220/203.2–203.29
See application file for complete search history.

(56) References Cited

U.S. PATENT DOCUMENTS

| | | | | |
|---|---|---|---|---|
| 4,337,873 | A * | 7/1982 | Johnson | 220/203.02 |
| 5,275,213 | A * | 1/1994 | Perkins | 141/59 |
| 5,327,946 | A * | 7/1994 | Perkins | 141/59 |
| 5,503,199 | A * | 4/1996 | Whitley et al. | 141/312 |
| 5,507,324 | A * | 4/1996 | Whitley et al. | 141/59 |
| 6,935,267 | B1 * | 8/2005 | Cotton | 114/364 |
| 7,665,492 | B2 * | 2/2010 | Burstein | B67C 11/02 141/332 |
| 7,726,363 | B2 * | 6/2010 | Benjey et al. | 141/302 |
| 8,539,993 | B2 * | 9/2013 | Hagano | 141/350 |
| 2007/0108211 | A1 * | 5/2007 | Zhu | 220/367.1 |
| 2011/0084076 | A1 * | 4/2011 | Whelan et al. | 220/367.1 |

* cited by examiner

*Primary Examiner* — Mark A Laurenzi
*Assistant Examiner* — Timothy P Kelly
(74) *Attorney, Agent, or Firm* — Hanley, Flight and Zimmerman, LLC

(57) ABSTRACT

Fuel fill apparatus for use with fluid delivery systems are described. An example fuel fill apparatus includes a body defining a throat area adjacent an opening of the body where the opening is configured to receive a fuel cap. A fuel fill portion defines a first passageway extending at a non-perpendicular angle relative to a longitudinal axis of the opening and a vent portion defines a second passageway. The first passageway is fluidly coupled to the second passageway via the throat area and a fuel nozzle retainer is disposed within the throat area.

23 Claims, 11 Drawing Sheets

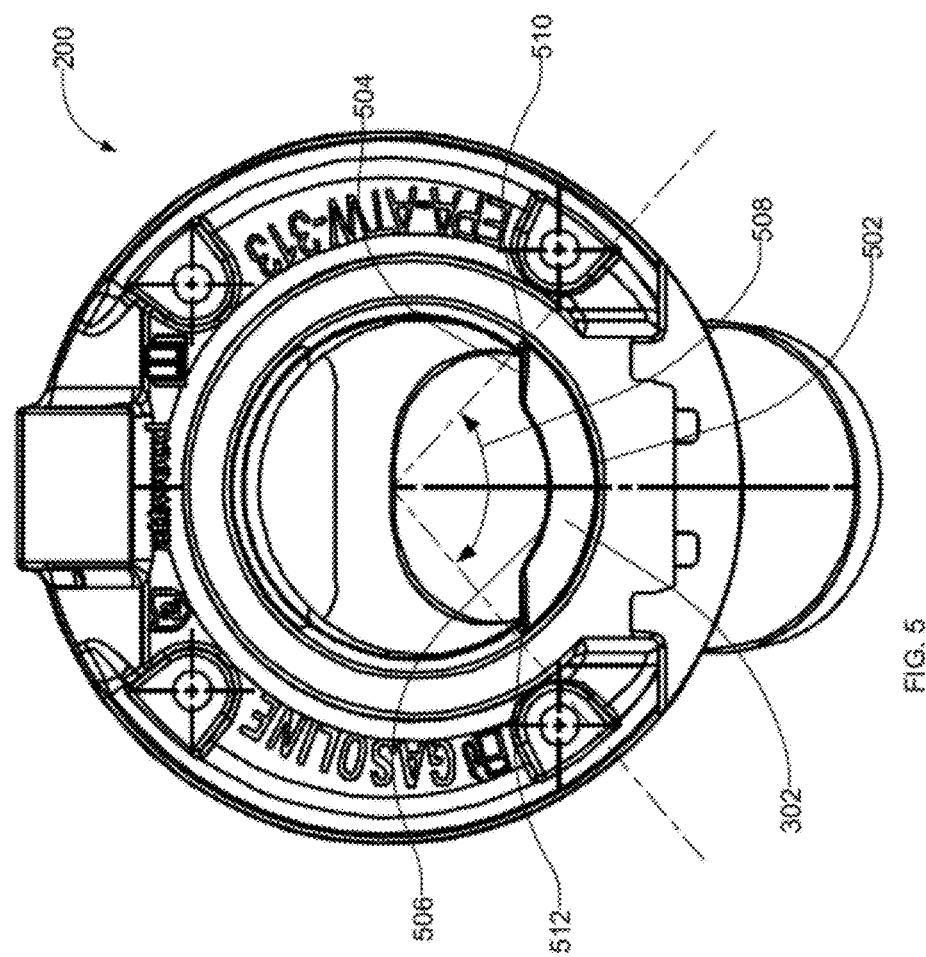
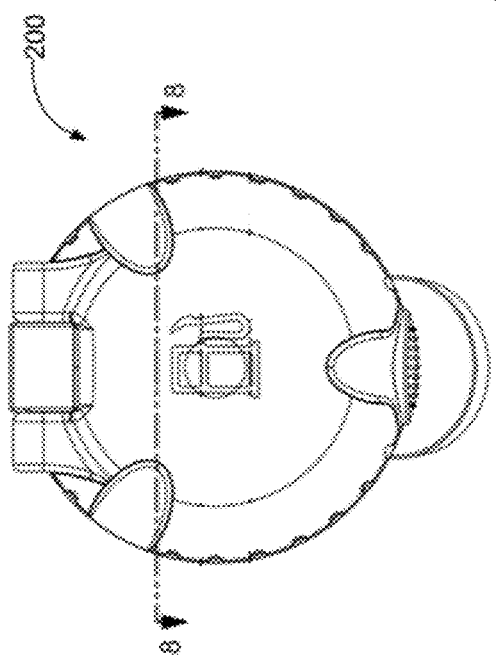

FUEL FILL APPARATUS FOR USE WITH FUEL DELIVERY SYSTEMS

CROSS REFERENCE TO RELATED APPLICATION

This patent claims the benefit of U.S. Provisional Patent Application Ser. No. 61/386,471, filed on Sep. 25, 2010, entitled FUEL FILL APPARATUS FOR USE WITH FUEL DELIVERY SYSTEMS, which is incorporated herein by reference in its entirety.

FIELD OF THE DISCLOSURE

The present disclosure relates generally to fuel delivery systems and, more particularly, to fuel fill apparatus for use with fuel delivery systems.

BACKGROUND

A fuel system of a marine vehicle typically includes a fuel fill apparatus fluidly coupled to a fuel tank. The fuel fill apparatus may include a deckfill that is adapted for mounting to a deck of the marine vehicle such as, for example, a deck of a boat. The deckfill includes an opening for receiving a nozzle such as, for example, a nozzle of a fuel pump, etc. During a fuel filling operation, as the fuel tank is being filled via the deck fill, the fuel vapors in the fuel tank are displaced and vented from the fuel tank to equalize the pressure within the fuel tank. Some fuel delivery systems include a venting system that vents the fuel tank to the atmosphere via the deckfill. In other words, the venting system is fluidly coupled to the atmosphere via the deckfill.

However, government agencies (e.g., the Environmental Protection Agency) have enacted regulations to limit the amount of evaporative emissions that can be legally emitted by boats and other marine vehicles during operation and/or non-operation of the marine vehicles. More specifically, government regulations (e.g., title 40 of the Code of Federal Regulations) have been enacted to control diurnal evaporative emissions of marine vehicles. In particular, these regulations limit the amount of evaporative diurnal emissions that a marine vehicle may permissibly emit during a diurnal cycle (e.g., periods of non-operation).

BRIEF DESCRIPTION OF THE DRAWINGS

FIG. 5 illustrates a plan view of the example fuel fill apparatus of FIGS. 2A, 2B, 3 and 4 having an example cover assembly removed.

FIG. 7 illustrates a plan view of the example fuel fill apparatus of FIGS. 2A, 2B, 3-5, and 6A.

DETAILED DESCRIPTION

In general, the example fuel delivery systems described herein may be used with marine crafts or vehicles. The example fuel delivery systems described herein include enhanced or improved evaporative emission apparatus to control or substantially reduce diurnal emissions. For example, the fuel delivery systems described herein may be configured to substantially reduce or prevent diurnal emissions through a venting system of the fuel delivery system when the pressure of the fuel within a fuel reservoir is below a predetermined pressure (e.g., 1 psi). More specifically, a venting system of the fuel delivery system is fluidly coupled to a fuel fill apparatus to equalize the pressure of the fuel tank. To vent the fuel tank, the fuel fill apparatus is implemented with a pressure relief valve system that allows air to flow within the fuel tank and only allows fuel vapors to escape the fuel tank when the pressure within the fuel tank is greater than a predetermined pressure value (e.g., greater than 1 psi). In particular, the fuel fill apparatus includes a redundant pressure relief valve system so that if a first pressure relief valve becomes inoperable, a second pressure relief valve vents the fuel tank.

Additionally, the fuel fill apparatus includes a vent passageway having a shape (e.g., a cross-sectional shape) to increase the flow of fuel vapors and/or air therethrough, while providing a relatively smaller profile to provide a greater throat area to the fuel fill apparatus and facilitate insertion of a fuel fill nozzle within an fuel fill opening of the fuel fill apparatus. The venting passageway may include a first portion having a first shape (e.g., a circular cross-sectional shape) and a second portion having a second shape (e.g., a rectangular cross-sectional shape) that is different than first shape. For example, at least a first portion of the vent passageway includes a substantially rectangular cross-sectional shape and at least a second portion of the venting passageway includes a circular cross-sectional shape. Additionally or alternatively, the vent passageway includes a transition having an angled or tapered profile that reduces the pressure differential between the first portion of the vent passageway and the second portion of the vent passageway.

Further, the fuel fill apparatus includes a nozzle retention apparatus that retains a fuel fill nozzle engaged with the fuel fill apparatus (e.g., via interference) without assistance from an operator or owner of the marine vehicle.

As used herein, a "fluid" includes, but is not limited to, a liquid such as fuel (e.g., gasoline), a vapor such as fuel vapor (e.g., gasoline vapor), a gas (e.g., air) and/or any combination or mixture thereof.

Figure 1:
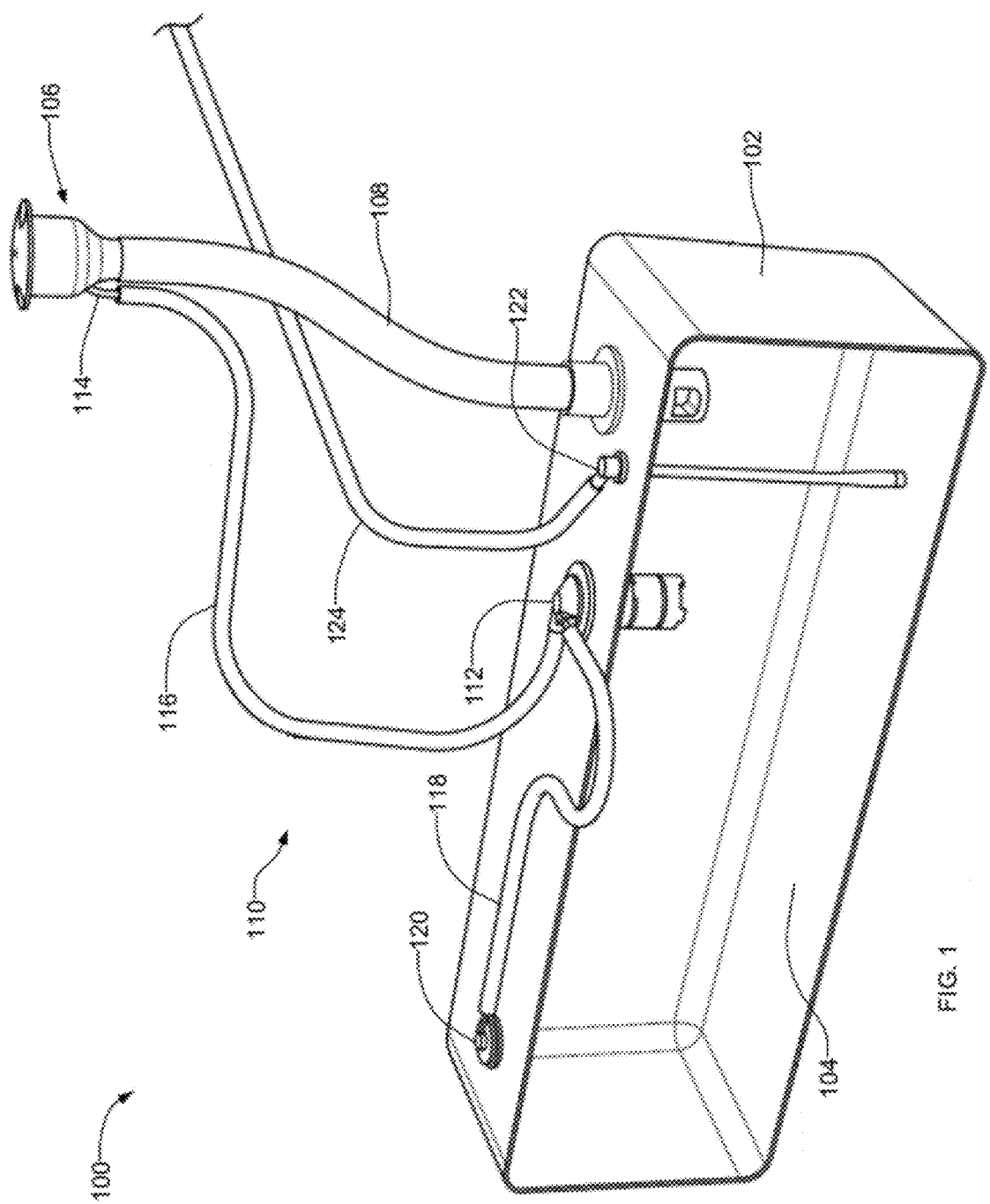
FIG. 1 is schematic representation of an example fuel delivery system described herein.

FIG. 1 illustrates an example marine fuel delivery system 100 described herein having improved evaporative emission controls. More specifically, the example fuel delivery system 100 described herein includes evaporative emission controls to meet or satisfy government diurnal emissions regulations (e.g., EPA regulations) without the use of a vapor collection apparatus. A vapor collection apparatus typically includes an emission(s)-capturing or filter material (e.g., an adsorbent material) such as, for example, activated carbon, charcoal, etc., that passively filters emissions by collecting and storing evaporative emissions such as, for example, hydrocarbons from fuel vapors venting to the atmosphere to reduce pollution to the environment.

Although effective in controlling or limiting emissions to the environment, a vapor collection apparatus can be relatively expensive. Additionally, a vapor collection apparatus often increases the overall dimensional footprint of a fuel delivery system and/or is typically mounted at a remote location from the fuel tank due to space limitations of the marine vehicle. Such a configuration requires additional or longer length tubing (e.g., a longer length vent line), which may increase fuel leakage to the environment via the tubing and/or tubing couplings.

The example fuel delivery system 100 of FIG. 1 includes a fuel tank 102 that is to be permanently mounted to a marine vehicle. However, in other examples, the fuel tank 102 may be a portable fuel tank (i.e., non-permanently mounted). The fuel tank 102 has a cavity or reservoir 104 to receive liquid fuel via a fuel fill apparatus 106. The fuel fill apparatus 106 is fluidly coupled to the cavity 104 of the fuel tank 102 via a filler tube or hose 108. The fuel delivery system 100 includes a venting system 110 fluidly coupled to the fuel tank 102 and the fuel fill apparatus 106. The venting system 110 includes a vent valve 112 fluidly coupled to a vent 114 of the fuel fill apparatus 106 via tubing 116. As described in greater detail below, the fuel fill apparatus 106 include means for venting the fuel vapors inside the fuel tank 102 to the atmosphere. Tubing 118 fluidly couples a grade valve 120 to the vent valve 112.

The venting system 110 equalizes the pressure in the fuel tank 102 to accommodate volumetric changes (e.g., expansion) in the fuel tank 102. For example, when the pressure of fuel and/or vapors in the fuel tank 102 increases, fuel vapors are released from the fuel tank 102 through the venting system 110 and the fuel fill apparatus 106. In other words, an increase in pressure in the fuel tank 102 causes fuel vapors (e.g., containing hydrocarbons) in the fuel tank 102 to vent or release to the atmosphere.

Additionally, during non-operation of the marine vehicle, for example, the fuel delivery system 100 may be subjected to daily ambient temperature changes that may cause the release of hydrocarbons to the environment (e.g., during diurnal temperature cycles). Such emissions are commonly referred to as diurnal emissions and are considered hazardous to the environment. Often, fuel or vapor leakage is exacerbated by diurnal temperature cycles. Diurnal emissions are evaporative emissions that are released due to the daily cycle of liquid fuel becoming fuel vapor during the daylight hours and condensing during the night. More specifically, during a diurnal cycle, the temperature of the air decreases during the night hours, causing the pressure of the fuel and/or fuel vapors in the fuel tank 102 to decrease. When the pressure decreases, air is drawn into the fuel tank 102 and mixes with the fuel vapors. During the daylight hours, the temperature of the air may increase causing the pressure of the fuel and/or vapors in the fuel tank 102 to increase. Such an increase in pressure causes fuel leakage or emission of fuel vapors via the fuel delivery system 100.

Thus, in general, the venting system 110 and the fuel fill apparatus 106 prevent or substantially reduce venting fuel vapors or gasses when the pressure of the fuel tank 102 is less than a predetermined pressure value relative to the atmospheric pressure and allow the flow of air to the fuel tank during a filling operation or when, for example, an engine (not shown) of a marine craft (not shown) demands fuel (e.g., during operation of the marine craft) from the fuel tank 102 via a fuel demand valve 122 and a fuel line 124.

Additionally, the example fuel delivery systems 100 provides diurnal emission control by only allowing the emissions of gasses and/or vapors (e.g., hydrocarbons) to the environment via the venting system 110 when the pressure of the fuel delivery system 100 (e.g., the pressure in the fuel tank 102) is greater than a predetermined pressure value (e.g., 1 psi) relative to atmospheric pressure and allows the flow of air to the fuel tank 102 when the pressure of the fuel within the fuel tank 102 is below a predetermined pressure relative to atmospheric pressure. Thus, the fuel delivery system 100 includes diurnal emission controls to prevent a continuous venting of fuel vapors to the atmosphere, thereby reducing the amount of emissions (e.g., hydrocarbons) released to the environment during, for example, a diurnal cycle.

Figure 2A:
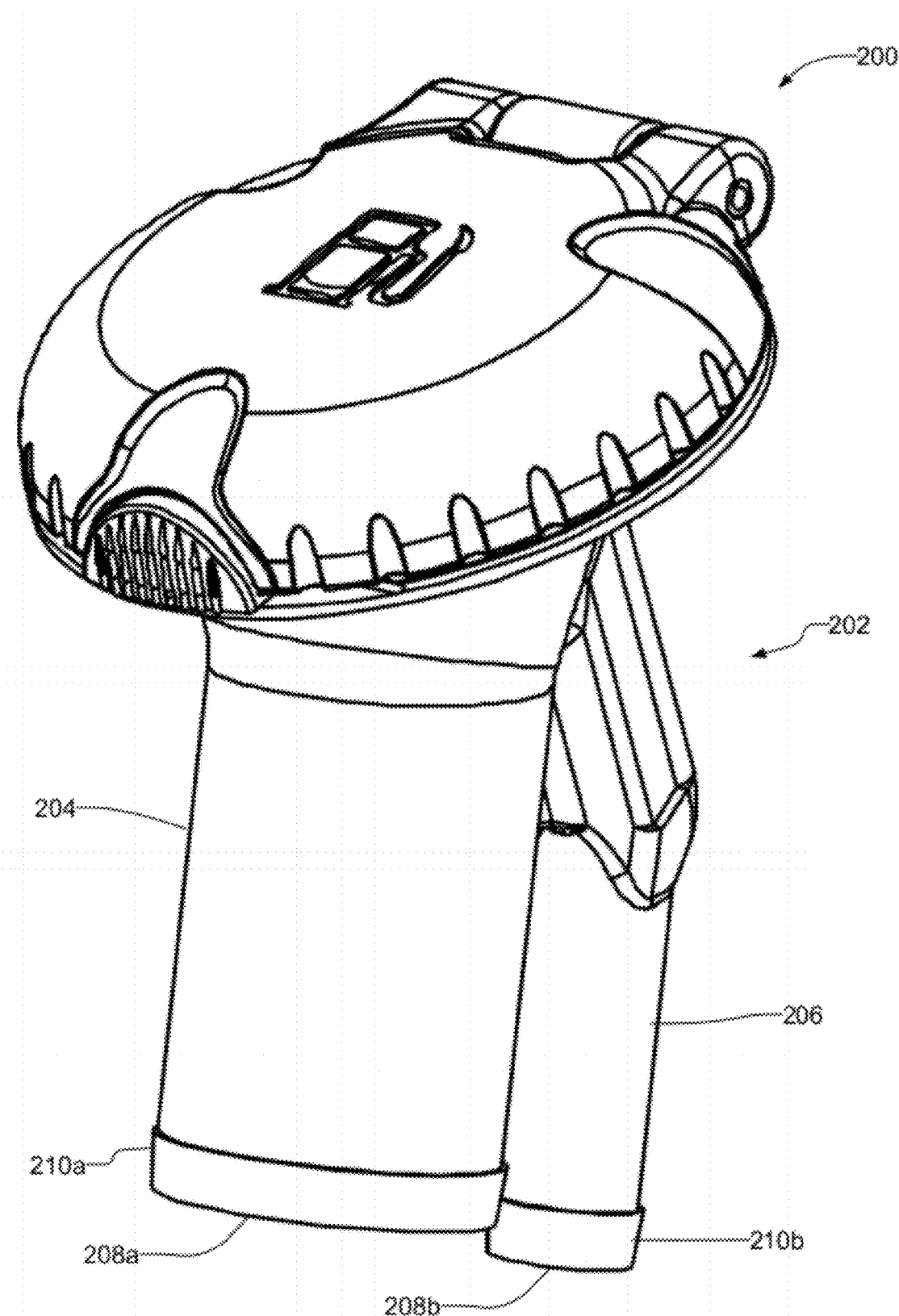
FIGS. 2A and 2B illustrate an example fuel fill apparatus described herein that can implement the example fuel delivery system of FIG. 1.
Figure 2B:
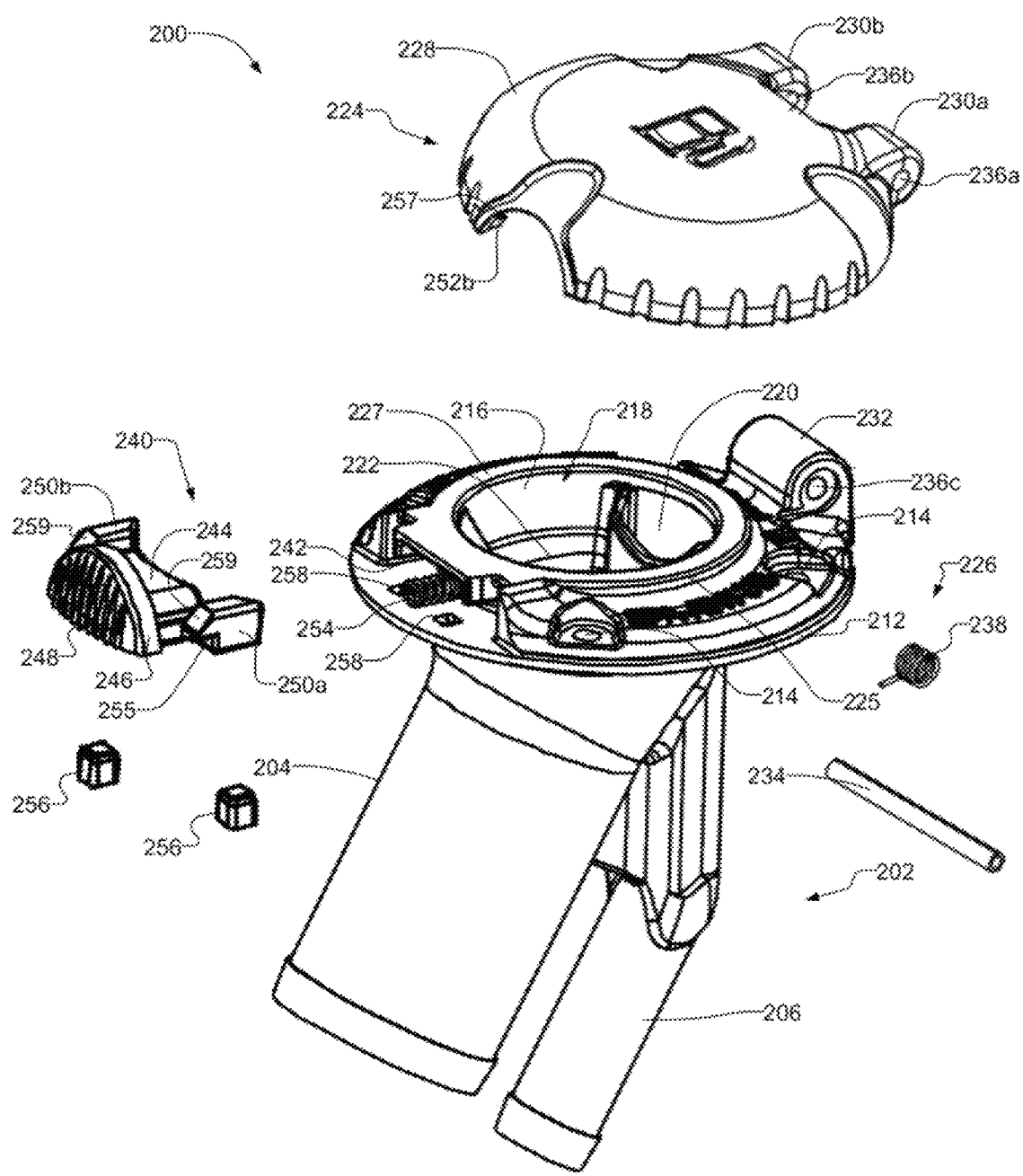

FIG. 2A illustrates an example fuel fill assembly or apparatus 200 that can be used to implement the fuel delivery system 100 of FIG. 1. In particular, the apparatus 200 may be used to implement the fuel fill apparatus 106 of FIG. 1. FIG. 2B illustrates an exploded view of the example fuel fill assembly or apparatus 200 of FIG. 2A. The example fuel fill apparatus 200 may be referred to as a deckfill and is adapted for mounting to a deck of a marine vehicle. Referring to FIGS. 2A and 2B the example fuel fill apparatus 200 includes a deckfill body 202 having a fuel fill portion or tube 204 adjacent a vent portion or tube 206. The fill fuel fill portion 204 and the vent portion 206 extend through an opening of a marine vehicle deck when the fuel fill apparatus 200 is mounted to a deck of a boat. Terminal ends 208a and 208b of the fuel fill portion 204 and the vent portion 206 include respective couplings or fittings 210a and 210b (e.g., barb fittings) to receive fluid hoses and/or other conduits or conduit. For example, referring to FIG. 1, the terminal end 208a of the fuel fill portion 204 receives the fill tube 108 and the terminal end 208b of the vent portion 206 receives the tubing 116.

The vent portion 206 is adjacent to and in fluid communication with the fuel fill portion 204. The vent portion 206 returns liquid fuel overflow from the fuel fill portion 204 back to the fuel tank 102 and provides venting of fuel vapors and passage of atmospheric air from and to the fuel tank 102. In this illustrated example, the fuel fill portion 204 and/or the vent portion 206 are angled or slanted to facilitate the positioning and installation of the fuel fill apparatus 200 to the boat and/or the fluid hoses or other conduits and reduce the possibility of fuel spillage when filling the fuel tank. However, in other example implementations, the fuel fill portion 204 and the vent portion 206 may be substantially straight.

The deckfill body 202 typically includes a base 212 that supports the fuel fill portion 204 and the vent portion 206 when the fuel fill apparatus 200 is mounted to a deck. The base 212 is illustrated as a circular flange and has a plurality of mounting holes 214 for mounting the fuel fill apparatus 200 to a surface of a deck via screws or any other suitable fastening mechanism(s) that pass into and/or through the mounting holes 214. In yet other examples, the base 212 can be square or any other polygonal-shaped member.

The deckfill body 202 has an opening 216 to receive a nozzle such as, for example, a nozzle (e.g., a nozzle 400 of FIG. 4) of a fuel pump, etc. The opening 216 defines a throat area 218 that fluidly couples an outlet 220 of the vent portion 206 and an inlet 222 of the fuel fill portion 204. A cover assembly 224 is removably coupled relative to the base 212 of the deckfill body 202 and is movable between an open position to allow access to the opening 216 of the base 212 and a closed position at which the cover assembly 224 sealingly engages an upper surface 227 of a rim 225 of the base 212 to prevent fluid flow through the opening 216 between the upper surface 227 of the rim 225 and the cover assembly 224.

In this particular example, the cover assembly 224 is pivotally coupled to the deckfill body 202 via a hinge assembly 226. The cover assembly 224 includes a cover 228 that has hinge members 230a and 230b spaced apart to receive a hinge member 232 of the base 212 of the deckfill body 202. A hinge pin 234 is received by apertures 236a-c of the respective hinge members 230a, 230b, and 232 to pivotally couple the cover assembly 224 relative to the deckfill body 202 (e.g., the base 212). A biasing element 238 (e.g., a spring) of the hinge assembly 226 biases the cover assembly 224 away from the opening 216 of the deckfill body 202 (i.e., an open position).

A latch mechanism or assembly 240 is coupled to the base 212 of the deckfill body 202 and retains the cover assembly 224 in a closed position relative to the opening 216 against the force of the biasing element 238. The base 212 includes a groove or track 242 that receives a latch 244 to lock or retain the cover assembly 224 in the closed position. The latch 244 includes a lever or arm 246 having a grip or ridge 248 and an engagement portion or hook 250a that engages a contact member 252a (FIG. 9B) of the cover 228 to lock or retain the cover assembly 224 in the closed position. In this particular example, the latch 244 includes a second engagement portion or hook 250b adjacent the engagement portion or hook 250a that engages a second contact member 252b of the cover 228. In this manner, the engagement portions 252a and 252b and/or the contact portions 252a and 252b provide redundant engagement portions 250a and 250b and/or contact portions 252a and 252b so that if one of the engagement portions 250a or 250b and/or the contact portions 252a or 252b become damaged or inoperable, the other one of the engagement portions 250a or 250b and/or the contact portions 252a or 252b can lock or retain the cover assembly 224 in the closed position. A biasing element 254 (e.g., a spring) biases the engagement portions 250a and 250b of the latch 244 toward the contact members 252a and 252b of the cover 228 to retain the cover 228 in the closed position. A surface 255 on each of the engagement portions 250a and 250b engages a surface 257 (e.g., an upper surface) of each contact member 252a and 252b.

When the cover assembly 224 is moved to a closed position, the contact members 252a and 252b of the cover 228 engage an angled or lead in surface 259 of the engagement portion 250a and 250b to cause the latch 244 to move inwardly toward the opening 216. When the contact members 252a and 252b clear the surface 259 of each engagement portions 250a and 250b, the biasing element 254 biases the latch 244 outwardly away from the opening 216 so that the surface 255 of each one of the engagement portions 250a and 250b engages the surface 257 of each of the respective contacts 252a and 252b.

To open the cover assembly 224, the lever 246 is moved in an inwardly direction toward the opening 216 against the biasing element 254 so that the engagement portions 250a and 250b release the contact members 252a and 252b of the cover 228. Stops 256 are disposed within openings 258 of the base 212 to prevent the lever 246 from being pulled away and/or removed from the groove or track 242.

Figure 3:
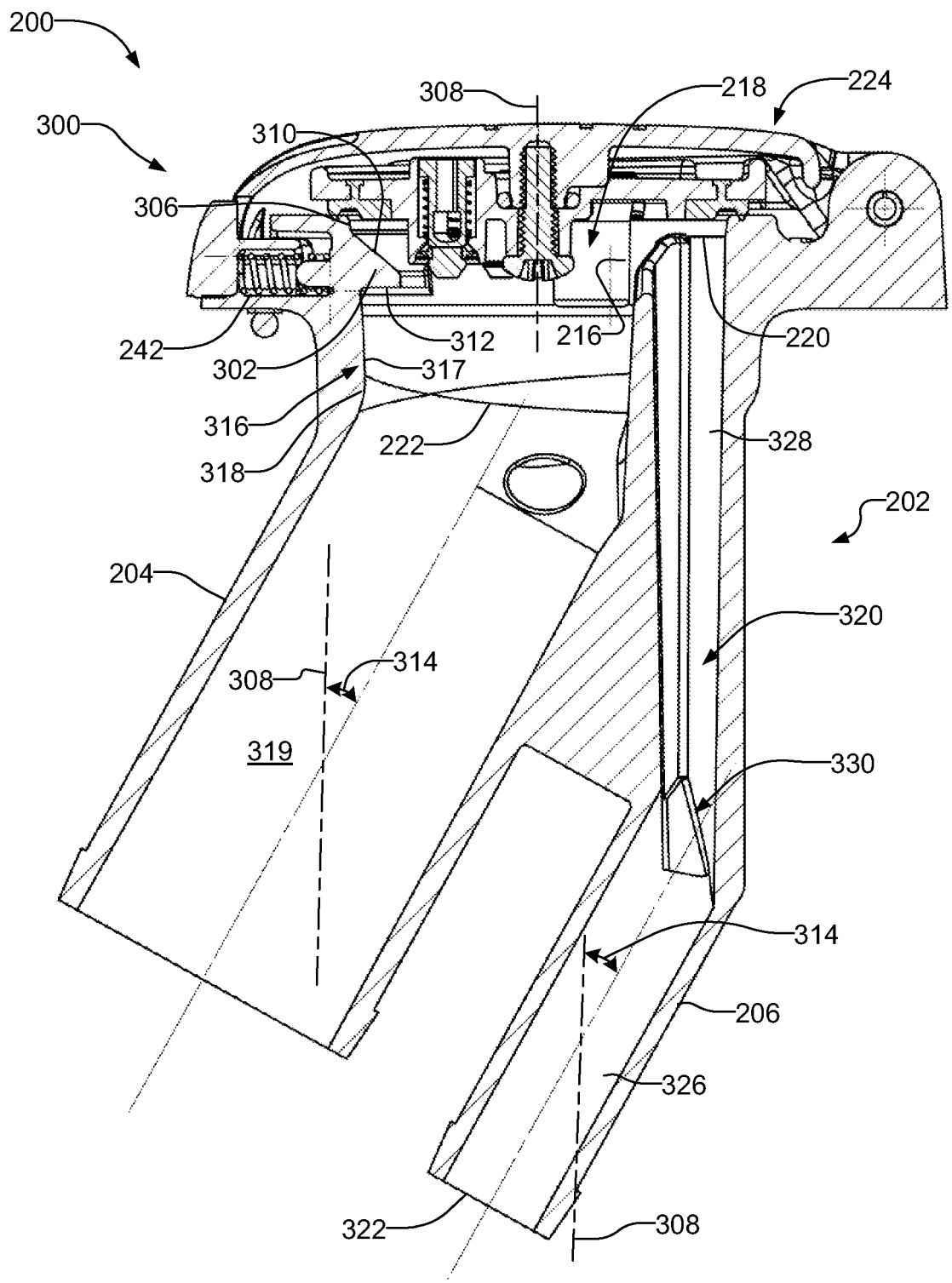
FIGS. 3 and 4 illustrate different cross-sectional views of the example fuel fill apparatus of FIGS. 2A and 2B.
Figure 4:
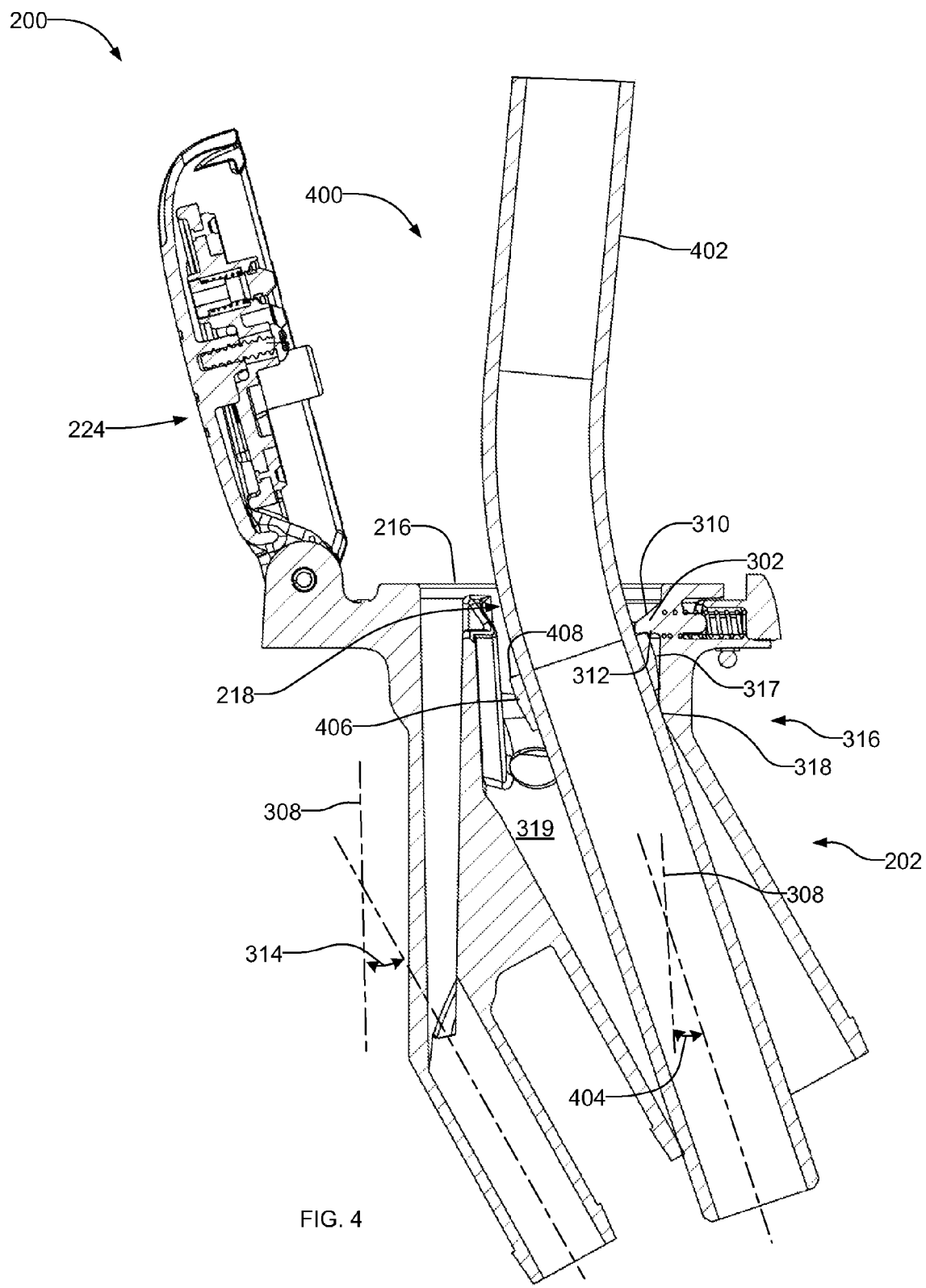

FIG. 3 is a cross-sectional view of the example fuel fill apparatus 200 of FIGS. 2A and 2B showing the cover assembly 224 in a closed position 300 to seal the opening 216. FIG. 4 is a cross-sectional view of the example fuel fill apparatus 200 of FIGS. 2A and 2B showing the cover assembly 224 in an open position 400 to provide access to the opening 216. Additionally, FIG. 4 illustrates a conventional fuel nozzle 402 coupled to the fuel fill apparatus 200.

Referring to FIGS. 3 and 4, the example deckfill body 202 includes a fuel nozzle retention apparatus 302 disposed within the throat area 218 of the opening 216. In this example, the nozzle retention apparatus 302 is integrally formed with the deckfill body 202. In particular, the nozzle retention apparatus 302 protrudes from an inner surface 306 of the opening 216 toward an axis 308 of the opening 216. In this example, the nozzle retention apparatus 302 includes an angled or tapered lead-in surface 310 and a shoulder 312. As shown, the nozzle retention apparatus 302 is adjacent the track 242 of the deckfill body 202. In other examples, the nozzle retention apparatus 302 may be implemented with a deckfill body that does not have the vent portion 206.

Further, in this example, as noted above, the fuel fill portion 204 and/or the vent portion 206 are angled or slanted relative to the axis 308 of the opening 216 to provide an insertion angle 314 (e.g., an angle of 29 degrees). Conventional deckfill apparatus include an insertion angle of approximately 35 degrees to receive a standard fuel nozzle (e.g., the nozzle 402). However, some nozzle types such as vapor recovery bellows-type nozzles may not properly function with a conventional deckfill body having an insertion of angle of 35 degrees. Thus, a conventional insertion angle (e.g., 35 degree angle) of a deckfill body may not be able to properly receive a vapor recovery nozzle.

The insertion angle 314 of the deckfill body 202 is configured to operate with different types of fuel nozzles such as, for example, conventional fuel nozzles (e.g., the nozzle 402), vapor recovery nozzles, etc. For example, the insertion angle 314 can receive the fuel nozzle 402, which has an angle 404 of approximately 20 degrees relative to the axis 308 of the opening 216 when coupled to the deckfill body 202. To achieve the insertion angle 314 that can accommodate various types of nozzles, the deckfill body 202 includes a relief area 316 having a flat surface 317 leading into a curved surface 318 of a passageway 319 of the fuel fill portion 204. For example, absent the relief area 316, the insertion angle 314 may be too small (e.g., less than 20 degrees) to properly receive a standard type nozzle (e.g., the nozzle 402). Thus, the relief area 316 enables the deckfill body 202 to provide the insertion angle 314 to receive standard and non-standard insertion angles of fuel fill nozzles.

FIG. 5 illustrates a top view of the fuel fill apparatus 200 of FIGS. 2A, 2B, 3 and 4. As most clearly shown in FIG. 5, the nozzle retention apparatus 302 may include a curved or arcuate (e.g., a semi-circular) edge or surface 502 having a radius of curvature that is substantially similar to the radius of curvature of the inner surface 306 of the opening 216. Also, the center of the radius of curvature of the surface 502 may be coaxially aligned with the axis 308. The nozzle retention apparatus 302 may also include an edge or side 504 opposite the edge 502 having an inwardly arcuate or concave portion 506. The side 504 joins the surface 502 at ends or edges 510 and 512. As shown, an angular difference or spacing 508 between the first end 510 and the second end 512 of the curved surface 502 may be, for example, 110 degrees. Such a profile increases a diameter of the opening 216 to provide a larger throat area 218. Maximizing the area of the throat 218 (e.g., the diameter of the opening 216) facilitates insertion of a nozzle (e.g., the nozzle 402) within the passageway 319 of the fuel fill portion 204. In other examples, the nozzle retention apparatus 302 may include any other suitable shapes or sizes.

Referring to FIGS. 3-5, the nozzle retention apparatus 302 provides or enables hands free operation of the nozzle 402. For example, an operator can insert the nozzle 402 within the opening 216, engage the automatic nozzle (not shown), and release a handle (not shown) of the nozzle 402 during a fueling or filling event. Additionally or alternatively, the nozzle retention apparatus 302 can receive the conventional nozzle 402 as shown in FIG. 4 or can receive a vapor recovery bellows-type nozzle.

As shown in FIG. 4, the nozzle retention apparatus 302 engages a feature 406 (e.g., a ring or a collar) of the nozzle 402 to retain the nozzle coupled to the deckfill body 202. The feature 406 is often standard on conventional nozzles. In particular, when an operator inserts the nozzle 402 within the opening 216, the tapered surface 310 guides or directs the feature 406 toward the shoulder 312. The arcuate edge 504 may provide clearance to enable a shoulder portion 408 of the engaging feature 406 to move adjacent the shoulder 312. As shown in FIG. 4, the nozzle retention apparatus 302 along with the flat surface 317 of the relief area 316 retains the nozzle 402 within the opening 216 of the deckfill body 202 via interference when the shoulder 312 engages the shoulder 408 of the engaging feature 406, allowing hand free operation of the nozzle 402 during a filling event.

Although not shown, the nozzle retention apparatus 302 may also retain a vapor recovery nozzle such as, for example, a stage 2 vapor recovery bellows-type nozzle within the opening 216 to allow for a hands free filling event. More specifically, the insertion angle 314 and the deckfill body 202 enable a vapor recovery nozzle to be received by the opening 216 and retained by the nozzle retention apparatus 302. In particular, a spring (or retaining spring or clip) of a bellows portion of the vapor recovery nozzle, which is coaxially aligned with the nozzle, engages the shoulder 312 of the nozzle retention apparatus 302 to retain the nozzle coupled to the deckfill body 202. Further, the bellows portion of the nozzle substantially covers or encircles (e.g., encases) the opening 216 of the deckfill apparatus 200 to prevent or significantly reduce fuel vapors from escaping to the environment via the opening 216 during a filling event. For example, the bellows portion is in fluid communication with the inlet 222 of the fuel fill portion 204 and the outlet 220 of the vent portion 206 to capture fuel vapors during a filling event.

Referring to FIGS. 3 and 4, in this particular example, to increase the throat area 218 of the opening 216 to accommodate different types of fuel nozzles, the vent portion 206 is provided with a low profile configuration. The vent portion 206 reduces the throat area 218, but without requiring a significant increase in the overall footprint or dimensional envelope of the deckfill body 202 that may otherwise be required in order to accommodate the nozzle retention apparatus 302. In other words, the profile of the vent portion 206 enables the deckfill body 202 to retain a dimensional footprint or envelope that is within dimensional limitations or standards commonly used in the industry.

In this particular example, the vent portion 206 includes a main passageway 320 between an inlet 322, which is in fluid communication with the fuel tank 102 (e.g., the fuel tank side), and the outlet 220, which is in fluid communication with the opening 216 of the deckfill body 202.

In this example, the main passageway 320 includes a first passage 326 and a second passage 328. In this example, the first passage 326 may include a first shape or profile (e.g., a first cross-sectional shape or profile) and the second passage 328 may have a second shape or profile (e.g., a second cross-sectional shape or profile) different than the first shape. For example, the first passage 326 may include a round profile or circular cross-sectional shape and the second passage 328 may include a rectangular profile or rectangular cross-section shape. Additionally, the main passageway 320 may include a transition portion 330 disposed between the first and second passages 326 and 328.

Figure 6A:
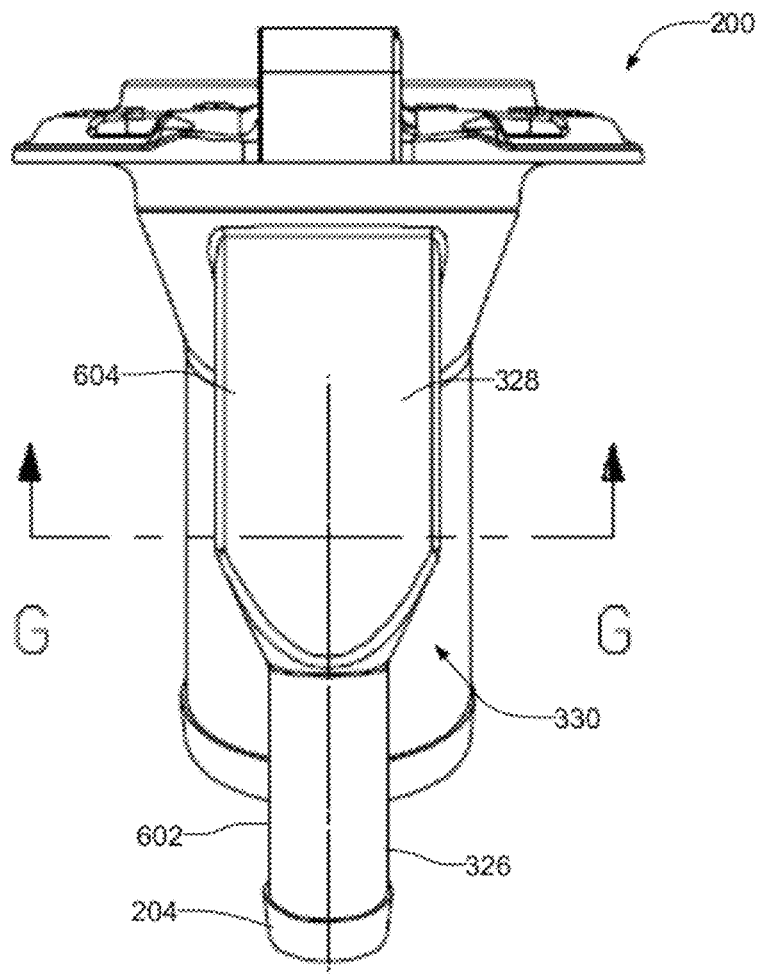
FIG. 6A illustrates a side view of the example fuel fill apparatus of FIGS. 2A, 2B, 3-5.
Figure 6B:
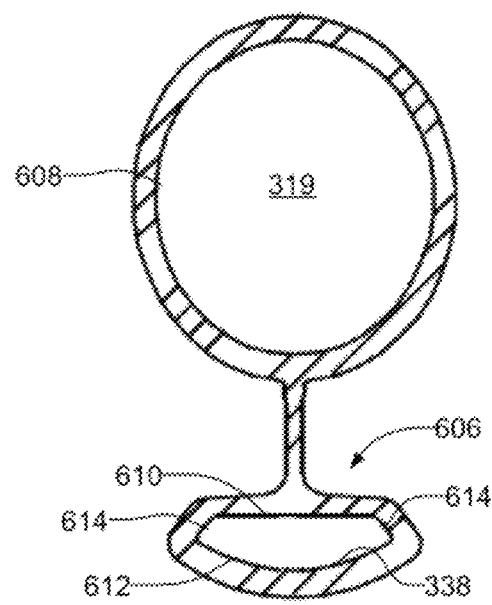
FIG. 6B is a cross-sectional view of the example fuel fill apparatus taken along line G-G of FIG. 6A.

FIG. 6A illustrates a side view of the example fuel fill apparatus 200 showing the vent portion 206. FIG. 6B illustrates a cross-sectional view taken along line G-G of FIG. 6A. Referring to FIGS. 6A and 6B, an outer surface 602 of the first passage 326 of the vent tube 206 has a substantially circular shape to receive the tubing 116 and an outer surface 604 of the second passage 328 has a substantially rectangular shape. The vent portion 206 provides a low profile dimensional envelope or footprint of the overall outer footprint of the deckfill body 202 as well as provides a low profile dimensional footprint within the throat area 218 of the deckfill body 202 as noted above.

As shown in FIG. 6B, a cross-sectional shape 606 of the second passage 328 adjacent the transition portion 330 is significantly different than, for example, a cross-sectional shape 608 of the passageway 319 of the fuel fill portion 204, which is shown as having a substantially circular cross-sectional shape similar to the shape of the first passage 326. In this example, the cross-sectional shape 606 of the second passage 328 includes a substantially straight portion 610 coupled to a substantially arcuate portion 612 via tapered or angled wall portions 614. However, although the second passage 328 may include a low profile flow path, the cross-sectional venting area of the second passage 328 may be greater than, less than, or substantially equal to a cross-sectional venting area of the first passage 326. For example, the cross-sectional venting area of the second passage 328 may be between about 104 mm$^2$ and 116.7 mm$^2$ and the cross-sectional venting area of the first passage 326 may be approximately 112 mm$^2$ FIG. 7 is a plan view of the example fuel fill apparatus 200 of FIGS. 2A, 2B, 3-5, 6A and 6B showing the cover assembly 224 coupled to the deckfill body 202 in the closed position 300.

Figure 8:
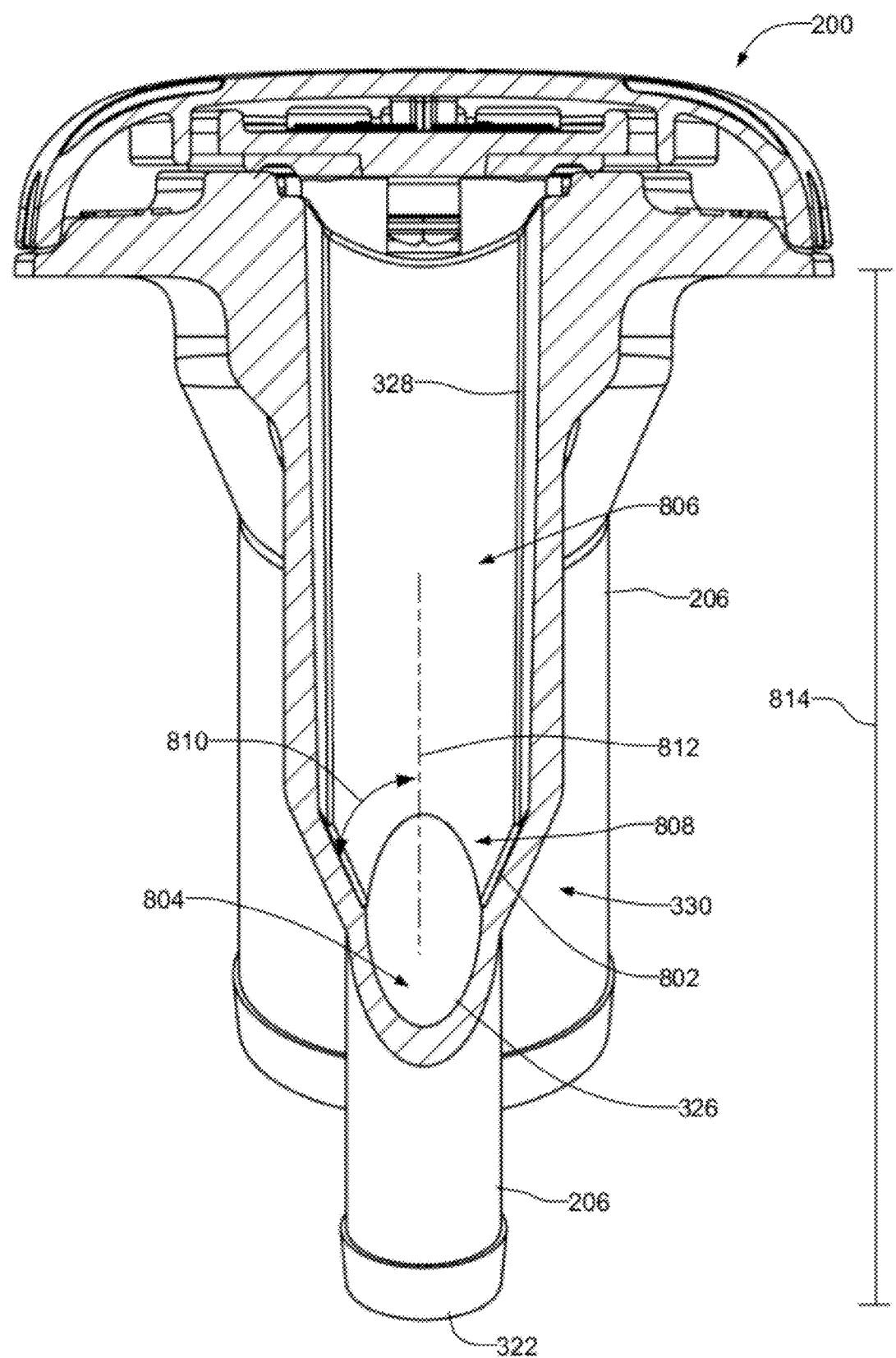
FIG. 8 is a cross-sectional view of the example fuel fill apparatus taken along line 8-8 of FIG. 7.

FIG. 8 is a cross-sectional view of the example fuel fill apparatus 200 taken along line 8-8 of FIG. 7. As shown in FIG. 8, the transitional portion 330 of the passageway 320 includes an angled or tapered profile or shape 802. As shown, the transition portion 330 tapers outwardly from a substantially round or oval flow path 804 of the first passage 326 to a substantially rectangular or non-circular flow path 806 the second passage 328. Thus, the transition portion 330 provides a gradual transition between the flow path 804 having a first shape (e.g., a round shape) and the flow path 806 having a second shape (e.g., a rectangular shape) different than the first shape. In this example, a cross-sectional area or shape of the transitional portion 330 adjacent the first passage 326 is smaller than a cross-sectional shape or area adjacent the second passage 328. Thus, in this example, a flow path 808 of the transition portion 330 increases in cross-sectional area between the first passage 326 and the second passage 328.

The angled profile transitional portion 330 may be at any desired angle 810 relative to an axis 812 of the deckfill body 202 and may be disposed at any desired location along a length 814 of the vent portion 206.

During a filling event, the transition portion 330 reduces an amount of pressure drop that may occur between the first passage 326 and the second passage 328 due to the angled vent portion 206 and/or due to the different shapes of the first and second flow paths 804 and 806. For example, the pressure drop across the transition portion 330 between the first and second passageways 326 and 328 may be between about 0.02 psi and 0.07 psi. Having a relatively small pressure drop between the inlet 322 and the outlet 220 of the vent portion 206 is highly beneficial for high fuel filling rates.

For example, during a filling event, an automatic nozzle (e.g., the nozzle 402 of FIG. 4) is fluidly coupled to the opening 216. An automatic nozzle provides an automatic shut-off by causing a valve of the fuel pump to close and prevent fuel flow via the nozzle to the fuel tank 102 during a filling operation when a sensor coupled to the valve detects a certain pressure within the fuel tank 102. For example, when the sensor detects a pressure within the fuel tank 102 via the fill tube portion 204 that is greater than a predetermined pressure, the sensor causes the automatic nozzle to shut-off fluid flow. During a filling operation, automatic nozzles typically require a fuel tank pressure of less than 0.5 psi for the automatic shut-off feature to function or operate properly (e.g., a premature nozzle shut-off during a filling operation).

Thus, a relatively high pressure differential (e.g., 0.2 psi) between the first and second flow paths 804 and 806 may cause the pressure within the fuel tank 102 to remain at a relatively high pressure (e.g., greater than 0.5 psi), which may cause a sensor of an automatic nozzle to activate, thereby prematurely shutting off fuel flow to the fuel tank 102. Thus, providing a relatively small pressure drop between the inlet 322 and the outlet 220 significantly reduces the likelihood that the nozzle will shut-off prematurely. In other words, the pressure within the fuel tank 102 can substantially equalize to atmospheric pressure by providing a relatively low pressure differential through the passage 320 of the vent portion 206. In some examples, the transition portion 330 can achieve reduced pressure differentials that are significantly lower than conventional fuel fill apparatus. For example, the vent tube 206 can provide reduced pressure differentials that are between approximately fifty percent and seventy-five percent (50% to 75%) of the pressure differential provided by a tube portion of a conventional fuel fill apparatus.

In this example, the deckfill body 202 of the fuel fill apparatus 200 of FIG. 2A can be made of resinous materials such as, for example, polypropylene, nylon and/or any other suitable materials that are resistant to impact, fuel, weather, etc., and can be manufactured as a substantially unitary piece or structure via, for example, injection molding. In other examples, the deckfill body 202 may be composed of a metal alloy material such as stainless steel, bronze, aluminum, and/or any other suitable materials that are resistant to impact, fuel, weather, etc.

Figure 9A:
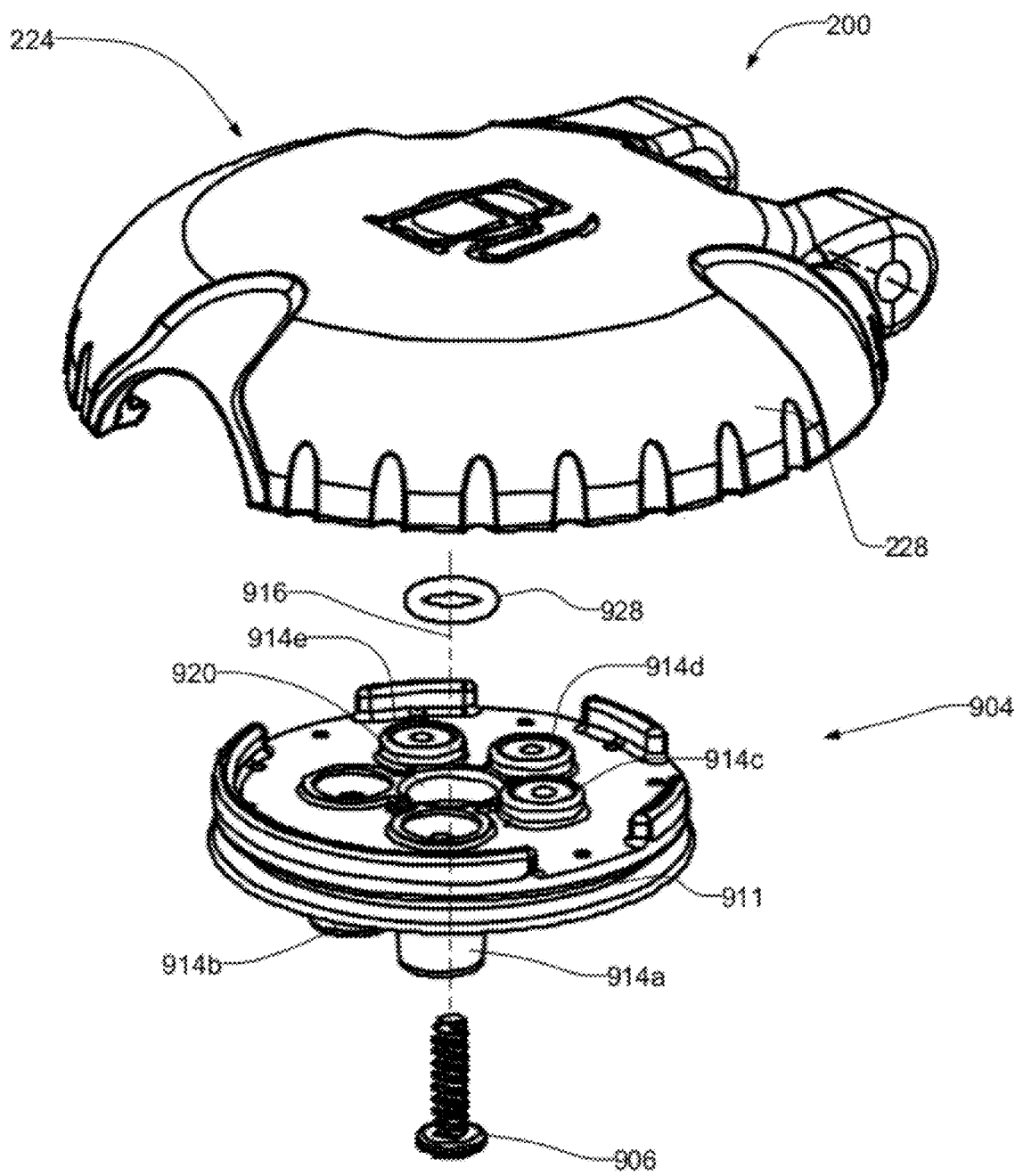
FIGS. 9A and 9B illustrate an example cover assembly of the example fuel fill apparatus of FIGS. 2A, 2B, 3-5, 6A and 7.
Figure 9B:
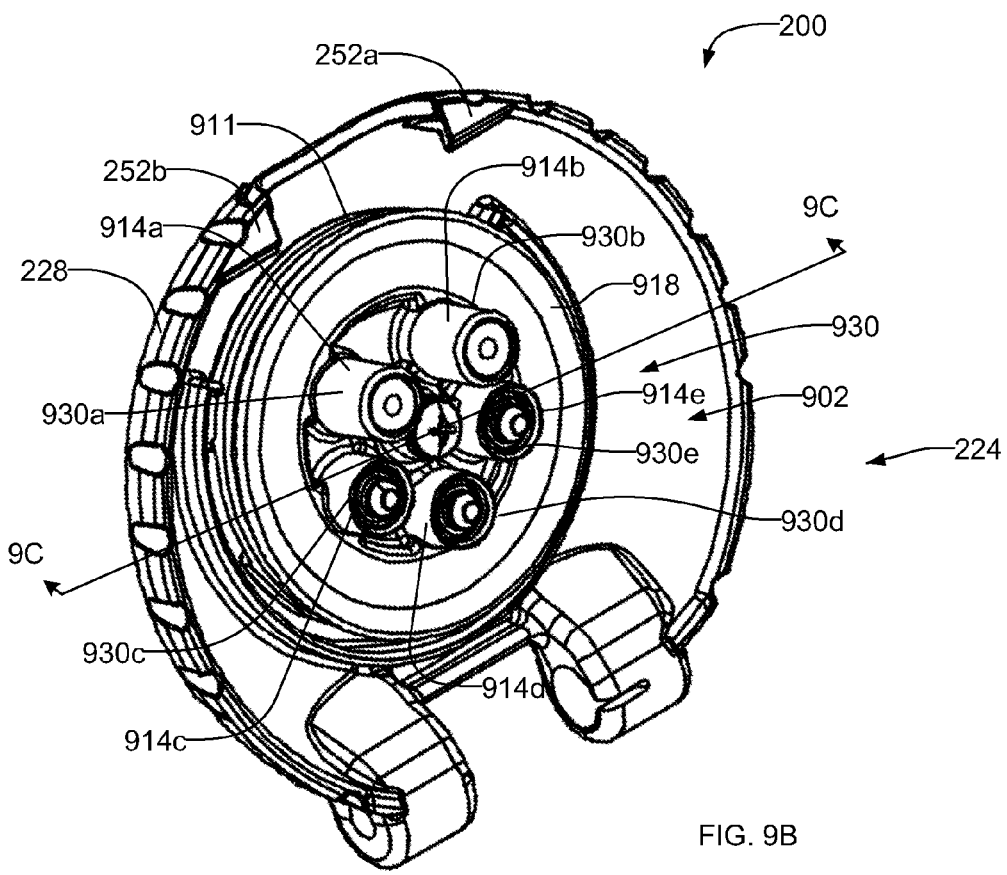
Figure 9C:
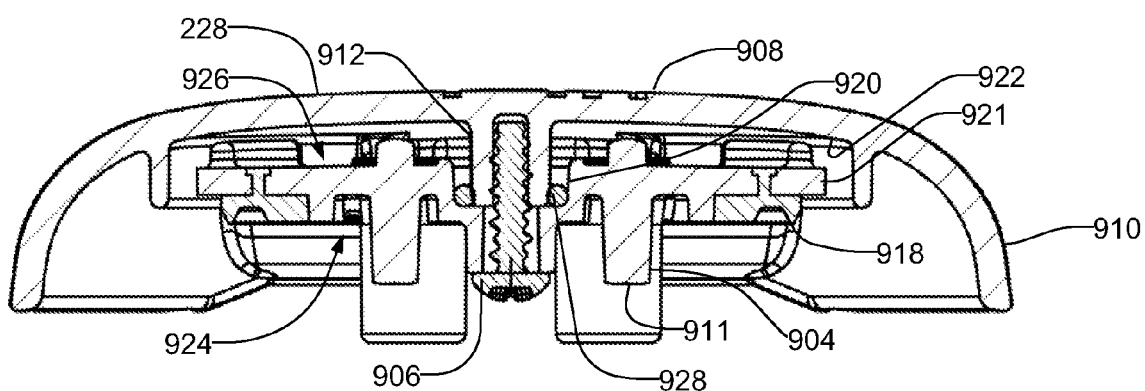
FIG. 9C is a cross-sectional view of the example cover assembly taken along line 9C-9C of FIG. 9B.

FIG. 9A is an exploded view of the example cover assembly 224 of FIGS. 2A, 2B, 3-5, 6A, 6B, 7 and 8. FIG. 9B. is an assembled view of the example cover assembly 224 of FIG. 9A showing an inner side 902 of the cover assembly 224. FIG. 9C is a cross-sectional view of the cover assembly 224 taken along line 9C-9C of FIG. 9B.

Referring to FIGS. 9A-9C, the example cover assembly 224 includes the cover 228, a fuel cap assembly 904, and a fastener 906 to couple the fuel cap assembly 904 to the cover 228. In particular, the cover 228 has a substantially arcuate surface 908 having a curved or rounded peripheral edge 910 and includes a cylindrical boss 912 for receiving the fastener 906.

In this example, the fuel cap 904 is a cylindrical body 911 having a plurality of chambers 914a-e integrally with the body 911. The chambers 914a-c are radially spaced about an axis 916 of the body 911. The body 911 may be composed of a resinous materials such as, for example, polypropylene, nylon and/or any other suitable material or materials that are resistant to impact, fuel, weather, etc., and may be manufactured as a unitary piece of structure via, for example, injection molding. The body 911 also includes a seal 918 (e.g., a rubber material) adjacent a peripheral edge 921 of the body 911. In this particular example, the seal 918 is overmolded (e.g., via injection molding) with the body 911. In other examples, the fuel cap 904 may include a threaded body that threadably couples to the opening 216 of the deckfill body 202 and the seal 918 is a unit seal that is coupled (e.g., manually assembled) to the body 911.

As most clearly shown in 9C, when the fuel cap 904 is coupled to the cover 228, the boss 912 of the cover 228 engages a recessed opening 920 of the body 911 to provide a gap between an inner surface 922 of the cover 228 and the fuel cap 904. The gap enables the flow of gasses or vapors (e.g., air, fuel vapors, etc.) to, for example, the surface 908 of the cover 228.

When coupled to the opening 216, the seal 918 of the body 911 sealingly engages the upper surface 227 (FIG. 2B) of the annular rim 225 (FIG. 2B) of the opening 216 to provide a tight fluid seal between the upper surface 227 of the rim 225 and fuel cap 904. The fuel cap 904 defines a first side or a pressure side 924 in fluid communication with the fuel (e.g., pressurized fuel) in the fuel tank 102 (i.e., a fuel side) and a second side or atmospheric side 926 in fluid communication with the atmosphere. A seal 928 disposed between the boss 912 and the recessed opening 920 prevents fluid leakage between the pressure side 924 and the atmospheric side 926 when the fuel cap 904 is coupled to the opening 216. Thus, to allow fluid flow between the pressure side 924 and the atmospheric side 926 of the fuel cap 904, fuel cap 904 is implemented with a plurality of fluid valves 930.

In this particular example, the fuel cap 904 includes a plurality of pressure relief valves 930a and 930b to vent pressure from the fuel tank 102 to the atmosphere and a plurality of vacuum valves 930c-e to allow air flow from the atmosphere and to the fuel tank 102. In this manner, if one of the pressure relief valves 930a or 930b becomes inoperable or damaged, the other one of the pressure relief valves 930a or 930b can vent the pressure from the pressure side 924 to the atmospheric side 926. Likewise, should one of the vacuum valves 930c-e become inoperable or damaged, the other one of the vacuum valves 930c-e can allow air flow between the atmospheric side 926 and the pressure side 924. Thus, the example fuel cap 904 provides a redundant pressure relief system. Each of the plurality of chambers 930a-e of the fuel cap 904 defines a fluid valve body of the fluid valves 930.

Figure 10:
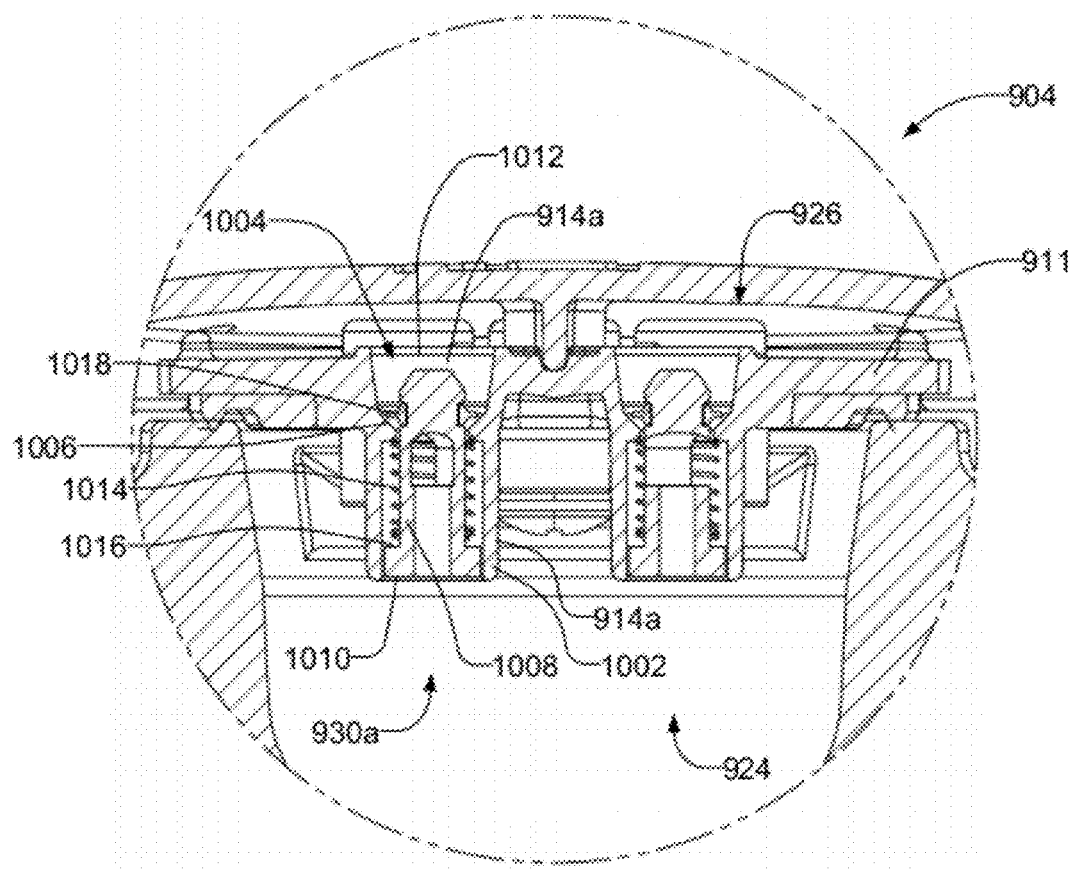
FIG. 10 is an enlarged cross-sectional view of the example cover assembly of FIGS. 9A-9C.

FIG. 10 is an enlarged cross-sectional view of an example pressure relief valve 930a of the fuel cap 904. The chamber 914a defines a valve body 1002 having a passageway 1004 and a valve seat 1006 integrally formed with the chamber 914a. A flow control member 1008 is disposed within the passageway 1004 of the valve body 1002 and moves between a first position to prevent fluid flow (e.g., fuel vapors) between an inlet 1010 and an outlet 1012 and a second position to allow fluid flow between the inlet 1010 and the outlet 1012. A biasing element 1014 (e.g., a spring) is disposed between a spring seat 1016 (e.g., integrally formed with the flow control member 1008) and the valve seat 1006. The biasing element 1014 biases the flow control member 1008 to the first position such that a seal 1018 (e.g., an O-ring) disposed along a portion of the flow control member 1008 sealingly engages the valve seat 1006 to prevent fluid flow between the inlet 1010 and the outlet 1012.

Figure 11:
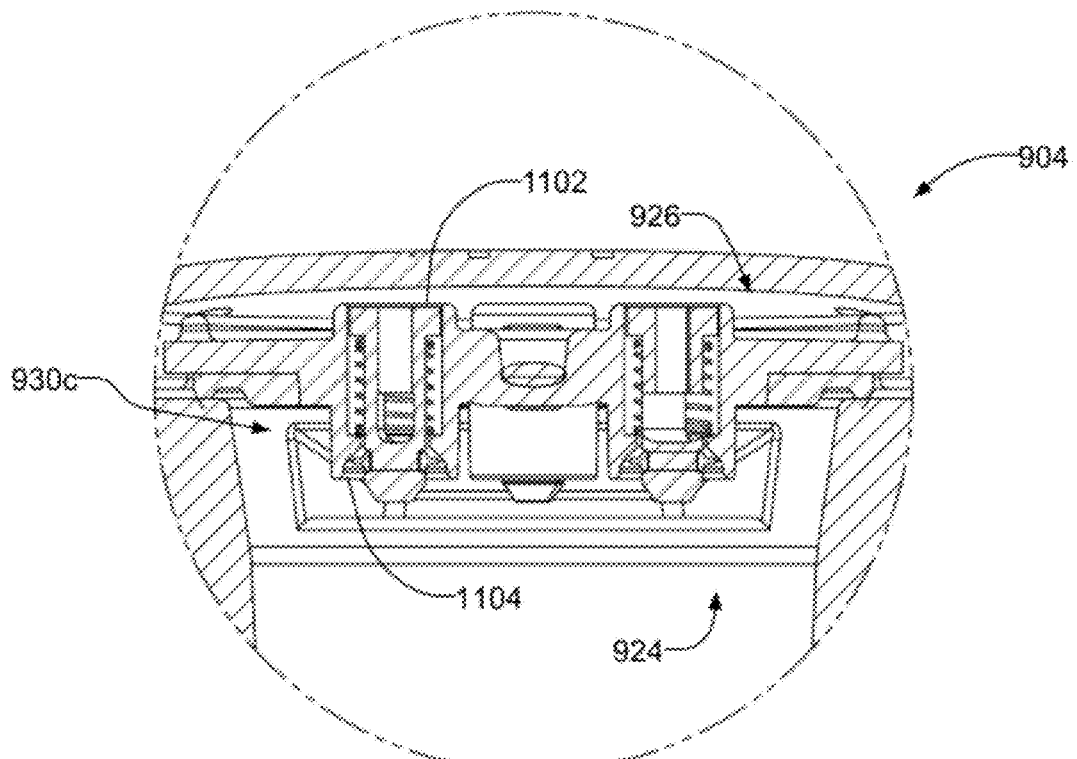
FIG. 11 is another enlarged cross-sectional view of the example cover assembly of FIGS. 9A-9C.

FIG. 11 is an enlarged cross-sectional view of the example vacuum valve 930c described herein. In the illustrated example, an inlet 1102 of the vacuum valve 930c is oriented opposite the inlet 1010 of the pressure relief valve 930a. In other words, the vacuum valve 930c enables fluid flow from the atmospheric side 926 to the pressure side 924 of the fuel cap 904 when the pressure differential from the atmospheric side 926 to the pressure side 924 across the vacuum valve 930c is greater than a reference pressure or atmospheric pressure. In other words, the vacuum valve 930c enables fluid flow between the inlet 1102 and an outlet 1104 when a pressure at the pressure side 924 is less than atmospheric pressure (i.e., when the engine draws or demands liquid fuel from the fuel tank 102 causing the pressure in the fuel tank 102 to decrease and thereby creating a vacuum or suction on the pressure side 924 of the fuel cap 904).

An example fuel cap having a pressure relief valve and a vacuum valve is described in U.S. patent application Ser. No. 12/061,183, which is incorporated herein by reference in its entirety.

In operation, when the fuel cap 904 is sealingly coupled to the opening 216, fuel vapors within the fuel tank 102 are relieved or vented via the pressure relief valves 930a and 930b and atmospheric air may flow within the fuel tank 102 via the vacuum valves 930c-e. During operation of the marine vehicle and/or during a diurnal cycle, the pressure relief valves 930a and 930b allow the flow of gasses or fuel vapors when the pressure at the pressure side 924 of the body 911 is more than a predetermined value (e.g., 1 psi, 5 psi) greater than the atmospheric side 926, which is at atmospheric pressure.

Although certain apparatus, methods, and articles of manufacture have been described herein, the scope of coverage of this patent is not limited thereto. To the contrary, this patent covers all apparatus, methods, and articles of manufacture fairly falling within the scope of the appended claims either literally or under the doctrine of equivalents.

What is claimed is:

1. A fuel fill apparatus comprising:
a body defining a throat area adjacent an opening of the body, the opening configured to receive a fuel cap;
a fuel fill portion defining a first passageway extending at a non-perpendicular angle relative to a longitudinal axis of the opening, wherein an axis of the first passageway and the longitudinal axis of the opening define an insertion angle of the fuel fill apparatus, the insertion angle being approximately 29 degrees to enable the first passageway to receive a vapor recovery fuel nozzle having a first angle and a non-vapor recovery fuel nozzle having a second angle different than the first angle;
a vent portion defining a second passageway, wherein the first passageway is fluidly coupled to the second passageway via the throat area; and
a fuel nozzle retainer disposed within the throat area, the retainer partially extending about a circumference of the opening.

2. The fuel fill apparatus of claim 1, wherein the throat area fluidly couples an inlet of the fuel fill portion and an outlet of the vent portion.

3. The fuel fill apparatus of claim 1, wherein the fuel nozzle retainer is integrally formed with the body.

4. The fuel fill apparatus of claim 1, wherein the fuel nozzle retainer protrudes from an inner surface of the opening and toward the longitudinal axis of the opening.

5. The fuel fill apparatus of claim 4, wherein the retainer is positioned away from an opening of the vent portion adjacent the throat area so that the fuel nozzle retainer does not affect an operation of the vent portion.

6. The fuel fill apparatus of claim 5, wherein the retainer includes a shoulder having a substantially flat surface oriented in a direction away from the throat area to engage a retainer feature of the nozzle, and a tapered surface oriented in a direction toward the throat area to guide the retainer feature of the nozzle toward the shoulder.

7. The fuel fill apparatus of claim 6, wherein the tapered surface engages the nozzle prior to the shoulder engaging the retainer feature to guide nozzle into engagement with the shoulder.

8. The fuel fill apparatus of claim 6, wherein the tapered surface is oriented in a direction opposite the shoulder.

9. The fuel fill apparatus of claim 6, wherein the retainer is an arcuate surface partially extending about a circumference of the opening, the retainer defining an edge joining a first end of the retainer and a second end of the retainer.

10. The fuel fill apparatus of claim 9, wherein the first end is spaced relative to the second end by approximately 110 degrees relative the longitudinal axis of the opening.

11. The fuel fill apparatus of claim 10, wherein a cross-sectional shape of the fuel nozzle retainer in a plane perpendicular to the longitudinal axis of the opening includes an edge extending in the opening and having a radius of curvature that is substantially similar to a radius of curvature of an inner surface of the opening.

12. The fuel fill apparatus of claim 11, wherein the edge includes an inwardly arcuate portion.

13. The fuel fill apparatus of claim 1, further comprising a relief area disposed between the fuel nozzle retainer and the first passageway.

14. The fuel fill apparatus of claim 13, wherein the relief area comprises a flat surface defined by the body that leads into a curved surface of the first passageway.

15. The fuel fill apparatus of claim 1, wherein the first passageway includes a first cross-sectional shape and the second passageway includes a second cross-sectional shape, and wherein the first cross-sectional shape is different than the second cross-sectional shape.

16. The fuel fill apparatus of claim 1, wherein the second passageway of the vent portion includes a first path fluidly coupled to a second path via a transition area, and wherein the transition area increases a cross-sectional area from the first path to the second path.

17. The fuel fill apparatus of claim 16, wherein the first path includes a first cross-sectional shape and the second path includes a second cross-sectional shape different than the first cross-sectional shape of the first path.

18. The fuel fill apparatus of claim 1, wherein the fuel cap includes a plurality of pressure relief valves and a plurality of vacuum valves.

19. The apparatus of claim 1, wherein the first passageway has a first portion and a second portion, the first portion extending substantially parallel relative to a longitudinal axis of the opening and the second portion extending at the non-perpendicular angle relative to the longitudinal axis of the opening.

20. The apparatus of claim 19, wherein the first passageway includes a relief having a contoured surface between the first portion of the first passageway and the second portion of the first passageway to transition the first portion of the first passageway and the second portion of the second passageway, Wherein the insertion angle and the relief enable the first passageway to receive the vapor recovery fuel nozzle and the non-vapor recovery fuel nozzle.

21. A fuel fill apparatus comprising:
means for defining a throat area adjacent an opening of the fuel fill apparatus configured to receive a fuel cap;
means for defining a first passageway extending at a non-perpendicular angle relative to a longitudinal axis of the opening such that an axis of the means for defining the first passageway defines an insertion angle of approximately 29 degrees to enable the means for defining the first passageway to receive a vapor recovery fuel nozzle having a first angle and a non-vapor recovery fuel nozzle having a second angle different than the first angle;

means for retaining a the fuel fill nozzle within the fuel fill apparatus, the means for retaining positioned adjacent the opening, the means for retaining having means for guiding the fuel fill nozzle and means for engaging the fuel fill nozzle, the means for guiding oriented in a direction toward the opening and the means for engaging oriented in a direction away from the opening such that the means for engaging is on a first side of the means for retaining and the means for guiding is on a second side of the means for retaining opposite the first side, the means for retaining extending partially about a circumference of the opening and having first and second ends that are spaced approximately 110 degrees relative to the longitudinal axis of the opening to increase a profile of the throat area to facilitate insertion of the fuel nozzle in the means for defining the first passageway;

first means for fluidly coupling a fuel tank and the opening of the fuel fill apparatus to allow fluid from the nozzle to flow into a fuel tank;

second means for fluidly coupling the fuel tank and the opening of the fuel fill apparatus to allow gas or fuel vapors to flow from the fuel tank to the opening, the second means for fluidly coupling includes first means for channeling fluid having a first cross-section and second means for channeling fluid having a second cross-section different than the first cross-section; and means for maintaining a pressure differential between the first means for channeling fluid and the second means for channeling fluid substantially constant as fluid flows between the first means for channeling fluid and the second means for channeling fluid.

22. The fuel fill apparatus of claim 21, further comprising two or more means for venting the fuel tank via the second means for fluidly coupling and two or more means for drawing air within the fuel tank via the second means for fluidly coupling.

23. A fuel fill apparatus comprising:
a body defining a throat area adjacent an opening of the body, the opening configured to receive a fuel cap;
a fuel fill portion defining a first passageway having a first portion and a second portion, the first portion extending substantially parallel relative to a longitudinal axis of the opening and the second portion extending at a non-perpendicular angle relative to a longitudinal axis of the opening, the first passageway including a relief having a contoured surface between the first portion of the first passageway and the second portion of the first passageway to transition the first portion of the first passageway and the second portion of the second passageway, an axis of the first passageway and the longitudinal axis of the opening defining an insertion angle of the first passageway, wherein the insertion angle is approximately 29 degrees, the insertion angle and the relief to enable the first passageway to receive a vapor recovery fuel nozzle having a first angle and a non-vapor recovery fuel nozzle having a second angle different than the first angle;
a vent portion defining a second passageway, wherein the first passageway is fluidly coupled to the second passageway via the throat area; and
a fuel nozzle retainer disposed within the throat area, the retainer partially extending about a circumference of the opening.

* * * * *